Aug. 27, 1968     R. C. UTTER     3,398,606
TRANSMISSION
Filed Dec. 30, 1965
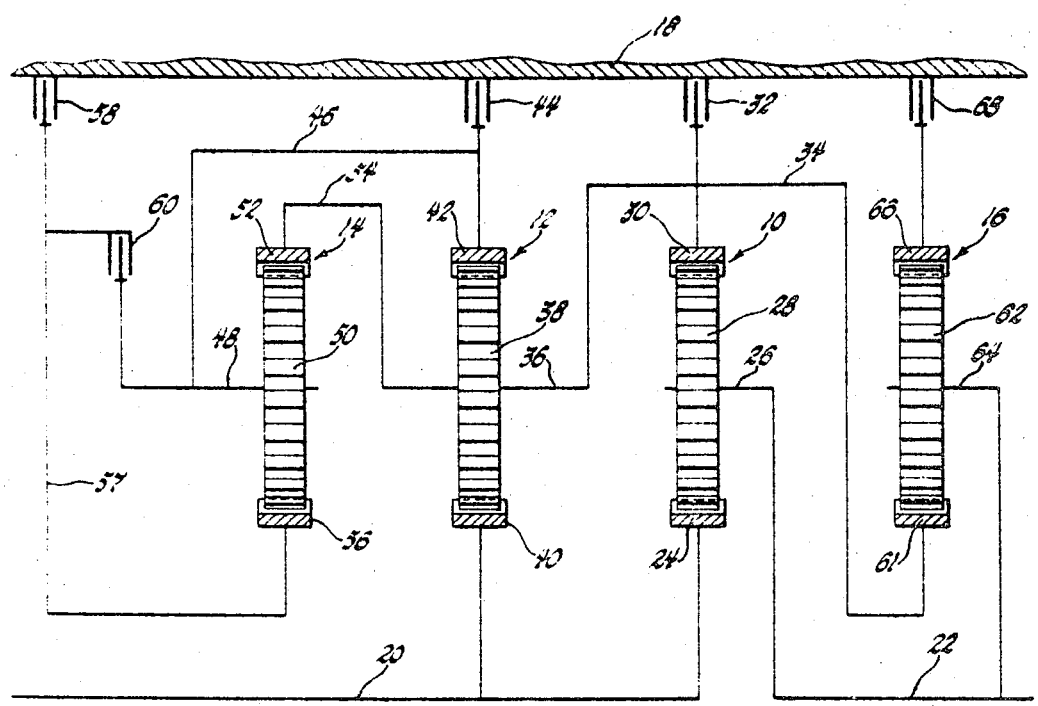
INVENTOR.
Robert C. Utter
BY
C. L. Phillips
ATTORNEY United States Patent Office 3,398,606
Patented Aug. 27, 1968

3,398,606
TRANSMISSION
Robert C. Utter, Indianapolis, Ind., assignor to General Motors Corporation, Detroit, Mich., a corporation of Delaware
Filed Dec. 30, 1965, Ser. No. 517,539
5 Claims. (Cl. 74—759)

ABSTRACT OF THE DISCLOSURE

A multispeed compound planetary gear transmission having a direct drive clutch integrated into the compound planetary gearing so that the slip speed in the clutch is determined by the relative rotation between two members of a compounding gear set.

This invention relates to a transmission and more particularly to a planetary gear transmission having low friction drive establishing device slip speed.

When selected groups of gear sets are arranged to provide compound action, friction horsepower loss in the friction drive establishing devices, which horsepower loss is proportional to the cube of the slip speed, may exceed design standards. As a result, the input speed range and selection of prime movers for the transmission is limited to maintain transmission performance within an acceptable range.

This invention is an improvement over transmissions of the type of Wilson 1,404,675 and is demonstrated in a transmission comprising four planetary gear sets having four forward speed ratio drives with the three lowest drives being obtained by the planetary motion of a first gear set which has an input driven sun gear, a carrier connected to the output and a ring gear which may be held or driven at selected speeds by a second and third gear set. The first forward speed ratio drive is obtained by braking the first gear set ring gear. The second forward speed ratio drive is provided by compounding the second gear set with the first gear set, the second gear set having its sun gear connected to the input, its carrier connected to the first gear set ring gear and its ring gear braked to establish the drive. The third forward speed ratio drive is provided by compounding the second and third gear sets with the first gear set, the third gear set having its carrier connected to the second gear set ring gear, its ring gear connected to the second gear set carrier and its sun gear held by a brake to establish the drive. The fourth gear set provides the reverse speed ratio drive and has its sun gear connected to be driven by the first gear set ring gear, its carrier connected to output and its ring gear connected to a brake for establishing the drive. Heretofore, the fourth forward speed ratio drive, which is a direct drive, has been obtained by employing a clutch to connect the third gear set sun gear to the input as shown in Wilson 1,404,675. It has been found that while the direct drive clutch between the third gear set sun gear and the input has been satisfactory for use in low input speed ranges and with low speed prime movers, this direct drive arrangement often does not meet the required performance standards in applications where high speed prime movers such as gas turbines provide power to the input in high speed ranges. According to this invention two members of the third gear set, particularly the sun gear and carrier, are clutched by a direct drive clutch to establish the direct drive. The third gear set sun gear and carrier are always rotated in the same direction while the direct drive clutch is disengaged thereby reducing the direct drive clutch slip speed and increasing transmission performance.

An object of this invention is to provide a planetary gear transmission having a friction drive engaging device connected to a compounding gear set to reduce slip speed.

Another object of this invention is to provide a transmission having a direct drive clutch integrated into compounding planetary gear sets so that slip speed in the clutch is determined by the relative motion between two members of a compounding gear set.

These and other objects of the invention will be more apparent from the following description of the preferred embodiment of the invention illustrated in the accompanying drawing:

A diagrammatic view of a transmission according to this invention is shown.

Referring to the drawing, the transmission generally comprises a planetary gear unit having three forward planetary gear sets 10, 12, 14 and a reverse planetary gear set 16. The planetary gear unit is housed by a transmission housing 18 and the gear sets are combined to operatively connect an input shaft 20 to a coaxially located output shaft 22 for four forward drive ranges and a reverse drive range.

The first or low gear set 10 has its sun gear 24 connected to input shaft 20 and its carrier 26 connected to output shaft 22, the pinions 28 supported on output carrier 26 meshing with sun gear 24. Pinions 28 also mesh with a ring gear 30 which may be held for reaction by a friction drive establishing brake 32 and is connected by a drum and hub assembly 34 to carrier 36 of gear set 12. The pinions 38, rotatably mounted on carrier 36, mesh with a sun gear 40 connected to input shaft 20. Pinions 38 also mesh with a ring gear 42 which may be held by a friction drive establishing brake 44 and is connected by a drum and hub assembly 46 to the carrier 48 of gear set 14. Pinions 50, rotatably mounted on carrier 48, mesh with a ring gear 52 which is connected by a drum and hub assembly 54 to carrier 36 of gear set 12. Pinions 50 also mesh with a sun gear 56 which is connected by a sub 57 to a friction drive establishing brake 58, hub 57 having a radially extended portion. Hub 57 and connected sun gear 56 can also be clutched to the carrier 48 by a friction drive establishing clutch 60. Clutch 60 thus serves to connect two relatively rotatable members of gear set 14 and reduces friction horsepower loss as will be described in greater detail later.

The reverse gear set 16 has its sun gear 61 connected by the assembly 34 to ring gear 30 of gear set 10. Sun gear 61 meshes with pinions 62 rotatably mounted on a carrier 64 which is connected to output shaft 22. Pinions 62 also mesh with a ring gear 66 which is held for reaction when a friction drive establishing brake 68 is engaged.

The friction drive establishing brakes and clutch are of conventional structure having friction plates and may be actuated in any known way, e.g. electrically, hydraulically, pneumatically or by some mechanical provision and in a certain sequence.

The transmission layout described above provides four forward speed ratio drives and a reverse speed ratio drive with compounding of certain groups of the gear sets to provide low planet pinion speeds. The first or low forward speed ratio drive is established when the drive establishing brake 32 is engaged to hold ring gear 30 of gear set 10 for reaction, all other drive establishing devices being disengaged. Then, with the input shaft 20 being driven by a conventional prime mover to drive the connected sun gear 24 forwardly, the pinions 28 are caused to rotate on their own axis and make an orbital progression around the sun gear 24 while walking along the ring gear 30 so that the output carrier 26 and connected outpt shaft 22 are driven forwardly at a reduced speed.

In the next two higher forward speed ratio drives, the sun gear 24 continues to be driven at input speed while the ring gear 30 of gear set 10 is driven forwardly at variable speeds determined by the gear sets 12 and 14, the second forward speed ratio drive being obtained by compounding gear set 10 with gear set 12 and the third forward speed ratio drive being obtained by compounding gear sets 12 and 14 with gear set 10.

To establish the second or first intermediate forward speed ratio drive, the previously engaged low drive establishing brake 32 is released and the drive establishing brake 44 is engaged to hold ring gear 42 of gear set 12 for reaction. Sun gear 40 is driven at input speed by its connection to input shaft 20 and causes carrier 36 and connected ring gear 30 of gear set 12 to revolve in the forward direction and at a reduced speed relative to input shaft 20 while at the same time sun gear 24 of gear set 10 rotates in the forward direction at input speed. The drives to the sun gear 24 and ring gear 30 combine in gear set 10 to cause the pinions 28 to drive the output carrier 26 and connected output shaft 22 in the forward direction with a higher speed ratio proportional to the increased speed ratio drive to ring gear 30.

The third or second intermediate forward speed ratio drive is established by releasing the first intermediate drive brake 44 and engaging the friction drive establishing brake 58 to hold the sun gear 56 of gear set 14. The input shaft 20 is geared by the ring gear 42 of gear set 12 to drive carrier 48 of gear set 14 in the forward direction and with the sun gear 56 held stationary, the pinions 50 make an orbital progression about sun gear 56 in the forward direction to drive ring gear 52 and connected carrier 36 of gear set 12 and ring gear 30 of gear set 10 forwardly and at a reduced speed relative to input shaft 20 but in a speed range higher than that obtained in the first intermediate forward drive range. The differential speed between the input driven sun gear 24 and the ring gear 30 is thus smaller than that provided in the first intermediate drive. The sun and ring gear drive combine in gear set 10 to cause the pinions 28 to drive the output carrier 26 and connected output shaft 22 in the forward direction with a higher speed ratio proportional to the increased speed ratio drive to ring gear 30.

The fourth or high forward drive range is a direct drive and is provided by disengaging the second intermediate drive brake 58 and engaging clutch 60 to prevent relative rotation between sun gear 56 and carrier 48 of gear set 14. This operation locks up gear set 14 and connected gear set 12 to provide a 1:1 speed ratio drive between input shaft 20 and ring gear 30 of gear set 10. Since sun gear 24 is also rotating at input speed, gear set 10 is thus locked up and there is provided a 1:1 speed ratio drive between input shaft 20 and output shaft 22.

The reverse speed ratio drive is established by engaging only brake 68 to hold ring gear 66 of gear set 16 stationary. The input driven sun gear 24 of gear set 10 transmits torque to the ring gear 30 and connected sun gear 61 through pinions 28. The torque thus introduced causes sun gear 61 of gear set 16 to rotate in the reverse direction and since the ring gear 66 is held stationary, pinions 62 make an orbital progression around the sun gear 61 in a direction opposite that of input shaft 20 to drive carrier 64 and connected output shaft 22 in the reverse direction and at a reduced speed.

In transmissions of this type it is conventional practice to constantly bleed coolant to the friction plates of the friction drive establishing devices to wet the plates and to dissipate the instant heat energy that results at drive engagement from the input shaft 20 being slowed down by the loaded output shaft 22. The fluid also acts to prevent the tendency of the friction plates to contact and rub. The viscous shear that occurs in the fluid and the slight rubbing result in a friction horsepower loss which is proportional to the cube of the slip speed between the cooperative friction plates.

Conventional practice has employed a direct drive clutch for connecting the sun gear 56 directly to the input shaft 20 and, as a result, the clutch slip speed ratio (sun gear 56 speed/input shaft 20 speed) is greater than 1:1 in the first forward speed ratio drive and decreases to an intermediate value in the second forward speed ratio drive and to 1:1 in the third forward speed ratio drive. In neutral with all drive establishing devices disengaged, the clutch slip speed ratio, when it is determined by sun gear 56 speed relative to input shaft 20 speed, exceeds that in the first forward speed ratio drive and increases to its highest value in the reverse speed ratio drive.

A transmission constructed according to this invention, will provide clutch 60 with a less than 1:1 clutch slip speed ratio in terms of input speed (carrier 48 speed–sun gear 56 speed/input shaft 20 speed) in the first forward speed ratio drive, which ratio decreases to an intermediate value in the second forward speed ratio drive and to the lowest value in the third forward speed ratio drive. In neutral, the clutch slip speed ratio in terms of input speed for clutch 60 will be less than 1:1 and will increase to slightly above 1:1 in the reverse speed ratio drive.

Friction horsepower loss is proportional to the cube of the slip speed and thus increases rapidly with increasing slip speed. In addition, clutch failure can result from too much heat, heat being the physical result of horsepower loss. It has been found that clutch mean slip speed expressed in feet per minute at the mean clutch diameter of the clutch plate facings is a factor in acceptable clutch design along with acceptable horsepower per square inch of clutch facing loads and acceptable clutch cycle duties. Thus, the transmission according to this invention can operate more efficiently, e.g. less friction horsepower loss, than the prior art at a given input speed. This transmission can also be used to efficiently harness higher input speeds, e.g., gas turbine speeds, than the prior art since the actual mean slip speed in clutch 60 relative to input speed is always lower than that of the prior art.

The above-described preferred embodiment is illustrative of the invention which, it will be appreciated, may be modified within the scope of the appended claims.

I claim:

1. In a transmission the combination of an input member; an output member; a first planetary gear set having a sun gear member connected to said input member, a ring gear member, and a carrier member connected to said output member having pinions meshing with said sun and ring gear member; a brake for holding said ring gear member of said first gear set; a second planetary gear set having a sun gear member connected to said input member, a ring gear member, and a carrier connected to said ring gear member of said first gear set having pinions meshing with said sun and ring gear member; a brake for holding said ring gear member of said second gear set; a third planetary gear set having a sun gear member, a ring gear member connected to said carrier member of said second gear set and a carrier member connected to said ring gear member of said second gear set having pinions meshing with said sun and ring gear member; a brake having a hub with a radially extending portion connected to said sun gear member of said third gear set for holding said gun gear member of said third gear set and a clutch axially arranged between said third gear set and the radially extending portion of said hub for connecting two members of said third gear set.

2. The invention defined in claim 1 and said two members of said third gear set connected by said clutch being said carrier and said sun gear member.

3. The invention defined in claim 2 and a fourth planetary gear set having a sun gear member connected to said ring gear member of said first gear set, a ring gear member, and a carrier connected to said output member having pinions meshing with said sun and ring gear member and a brake for holding said ring gear member of said fourth gear set.

4. In a transmission the combination of a power input member; a power output member; a first planetary gear set having a sun gear member connected to said input member, a ring gear member, and a carrier member having pinions meshing with said sun and ring gear member; means for drivingly connecting both said carrier member of said first gear set and said power input member to said power output member; a second planetary gear set having a sun gear member, a ring gear member connected to said carrier member of said first gear set and a carrier member connected to said ring gear member of said first gear set having pinions meshing with said sun and ring gear member; a brake having a hub with a radially extending portion connected to said sun gear member of said second gear set for holding said sun gear member of said second gear set and a clutch axially arranged between said first gear set and the radially extending portion of said hub for connecting two members of said second gear set.

5. The invention defined in claim 4 and said two members of said second gear set connected by said clutch being said carrier and said sun gear member.

References Cited

UNITED STATES PATENTS

| | | | |
|---|---|---|---|
| 1,404,675 | 1/1922 | Wilson | 75—761 |
| 2,329,724 | 9/1943 | Mauer | 74—759 X |
| 2,478,868 | 8/1949 | Hasbany | 74—763 |
| 2,799,184 | 7/1957 | Miller | 74—759 |
| 3,267,769 | 8/1966 | Tuck et al. | 74—759 |

FOREIGN PATENTS 469,881  8/1937  Great Britain.

FRED C. MATTERN, JR., *Primary Examiner.*

A. T. McKEON, *Assistant Examiner.*